March 21, 1967　　L. A. MORTENSEN　　3,309,748
PLASTIC FASTENING MEMBER FOR SNAP FASTENERS
Filed Sept. 29, 1964　　2 Sheets-Sheet 1

United States Patent Office 3,309,748
Patented Mar. 21, 1967

3,309,748
PLASTIC FASTENING MEMBER FOR
SNAP FASTENERS
Louis Aackersberg Mortensen, Skodsborg Strandvej 196,
Skodsborg, Denmark
Filed Sept. 29, 1964, Ser. No. 400,032
Claims priority, application Denmark, Nov. 12, 1963,
5,306/63
10 Claims. (Cl. 24—216)

This invention relates to a plastic fastening member for snap fasteners and comprises resilient ribs being fixed at both ends and defining completely or partly an insertion opening for a stud or the like having a head.

Snap fasteners of this type are, for example, used for securing tarpaulins and hoods or tops to boats and cars, for raincapes, raincoats and other garments, for closing tents or gathering parts hereof, altogether in cases when a comparatively thin plate material or fabric is to be releasably but comparatively strongly locked to another plate material or another part or object.

The known plastic fastening members of the type mentioned are integrally formed and consist of a square frame within which the resilient ribs fixed at the ends and defining the insertion opening for the stud are arranged. As the head of the stud is passed through the insertion opening, the ribs yield outwardly in the plane of the fastening member, and when the head of the stud has been passed through the insertion opening, the ribs snap back again, whereby the head of the stud is releasably held by the fastening member. The known fastening members are fixed to the fabric or the plate material, in connection with which they are to be used, by sewing the frame of the fastening member to the fabric. When the snap fastener is to be released, the fabric or plate material is gripped and drawn so strongly outward that the stud hereby again bends the resilient ribs outwards from one another and may thus be drawn back through the insertion opening. The fabric or the plate material will hereby be rather heavily stressed at the points where the fastening member is fastened by sewing, so that there will be the risk that either the fabric or the sewing bursts.

The object of the invention is to provide a fastening member of the above-mentioned type which may be quickly and easily mounted in such a way that there is no danger that the fastening member is torn off, or that the fabric or plate material, on which said fastening member is mounted, is damaged when the snap fastener is used.

The fastening member according to the invention is characterized in that it is provided with locking means and adapted to be locked together with another correspondingly formed fastening member by means of said locking means. The corresponding fastening members may then be arranged on each side of a fabric or another plate material and then be locked together by means of the locking means. The fabric or the plate material, on which the fastening members are mounted, will then be compressed and held uniformly between the fastening members, so that there will be no risk of strong local stresses in the fabric. The fastening member according to the invention furthermore enables a very safe locking of the snap fastener without corresponding great forces for releasing the snap fastener being required, as by the use of a stud having a sufficiently long neck it will be possible to pass the head on the saud in between and beyond the resilient ribs on both opposite fastening members. In this way there will be question of a double locking of the stud in the fastening member.

The resilient ribs of the fastening member normally form a polygon-shaped insertion opening, and the more sides said polygon has the more difficult it will normally be to lock together and release the parts of the snap fastener, but on the other hand an insertion opening having several side edges will give a good security against lateral displacement of the fastening member and the stud in relation to one another. The fastening member may according to the invention be adapted to be fastened to an identical fastening member in such a way that each rib in one of the fastening members lies transversely to opposite ribs in the other fastening member. The resilient ribs in said two fastening members will then together form a polygon-shaped insertion opening, the number of sides of which being twice the number of sides for the insertion opening in the separate fastening member. Thus a great security against lateral displacement of the separate parts of the snap fastener is obtained without any essentially simultaneously increase of the force being necessary to lock and release the parts of the snap fastener.

The fastening member may according to the invention have two substantially parallel ribs arranged in spaced relation and be adapted to be secured to another identical fastening member in such a way that the ribs in one of the fastening members are substantially perpendicular to the ribs in the other. When two such identical fastening members are thus arranged that their ribs are substantially perpendicular to each other, said ribs will together form a substantially square insertion opening preventing lateral displacement of the parts of the snap fastener, and furthermore, the slot-shaped opening between the parallel ribs on each fastening member will facilitate the insertion of the head of the stud, the slot-shaped opening leading the head into the square opening.

The locking means of the fastening member may be of any suitable type, thus they may, for example, serve to rivet or weld together two fastening members. However, it would be advantageous to form the fastening members in such a way that the use of loose locking means and complicated tools is avoided. The locking means may according to the invention have the form of locking studs projecting to one side and arranged perpendicularly to the plane of the fastening member, said locking studs having a head at their free end, and in the fastening member there may be holes adapted to receive the free ends of the studs on another corresponding fastening member, the diameter of said holes being smaller than the one of the heads. Two fastening members may then in a very simple way be locked by placing the locking studs on one of the fastening members opposite the corresponding holes in the other fastening member and by means of a suitable tool, for example, tongs having especially formed jaws, pressing the heads of the locking studs in through the holes. In this simple way and without using loose connecting means a permanent locking of the two fastening members being arranged on each side of a fabric or another plate material may be obtained.

By this way of mounting, however, the fastening members may only be mounted on a material having a quite definite thickness corresponding to the length of the necks of the locking studs. This is not satisfactory in instances in which fastening members are to be used the locking studs of which are of different lengths, as, for example, when snap fasteners are to be mounted on a tarpaulin both at places where the tarpaulin comprises a single layer of fabric and at places where the tarpaulin is reinforced with one or several additional layers of fabric. However, the locking studs may according to the invention be arranged on thin ribs which are fixed at both ends but otherwise free, said ribs being formed integrally with the fastening member in such a way that they may be resiliently bent outwards in the longitudinal direction of the locking studs. Accordingly, the fastening members simply may be mounted on plate materials differing in thickness, as the flexible ribs, on which the locking studs are mounted, may be bent outwards in the longitudinal direction of the studs and thus increase the effective length of the studs. In this way the fastening members are very generally useable and so it is not necessary to produce them in a great many types, which would otherwise have been the case. Furthermore, said ribs serve to hold the fastening members against the intermediate material with a suitable, resilient force.

The number of ribs defining the insertion opening may according to the invention be the same as the number of ribs on which the locking studs are arranged, and each of the last-mentioned ribs may at their centre have a locking stud and may extend along the outside of and parallel to each of the first-mentioned ribs, while all of the holes for the locking studs may be arranged at the same distance from the centre of the fastening member as the locking studs, and each of said holes may lie halfway between two succeeding locking studs. All the fastening members may then be produced identically so that it is only necessary to use a single mould. In mounting the fastening members two identical fastening members are placed opposite each other in such a way that the locking studs on one of the fastening members lie opposite the corresponding holes in the other, whereafter the heads as previously explained are pressed through the holes. Because of the symmetrical structure of the fastening members the ribs defining the insertion opening will lie transversely to each other so that said ribs together form a polygon resulting in a good centering and securing of the head of the stud of the snap fastener.

The invention will now be further explained with reference to the drawings, in which.

Figure 1:
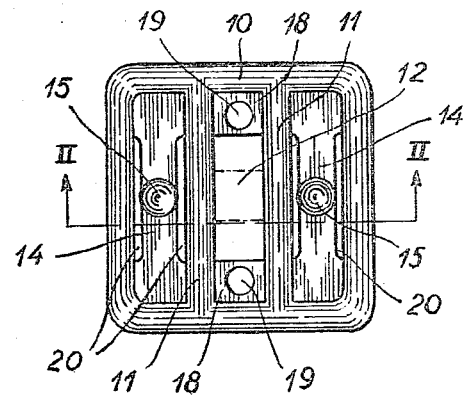
FIG. 1 is an elevation view of an embodiment of a fastening member, according to the invention, for a snap fastener.

The fastening member shown in FIG. 1 is produced integrally of a strong and resilient plastic material, for example, nylon. The fastening member has a substantially square frame 10 with rounded off corners and a substantially circular cross-section. Two ribs 11 arranged in spaced relation extend between opposite sides of the frame. Between the ribs there is an insertion opening 12 for a stud 13 provided with a head, see FIG. 3, and being adapted to cooperate with two of the shown fastening members, when they are mounted together as will be described hereinafter.

Figure 2:
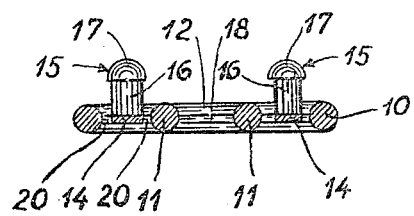
FIG. 2 is a section along the line indicated by II—II in FIG. 1.
Figure 3:
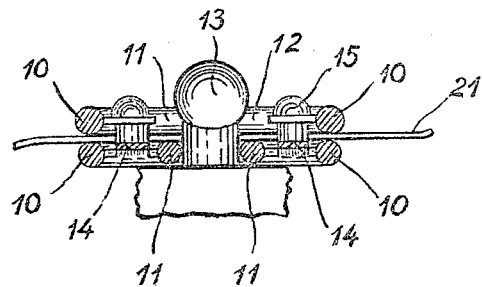
FIG. 3 is a section in a snap fastener comprising two fastening members of the type shown in FIG. 1 and a stud having a head.

Between each of the ribs 11 and the adjacent side of the frame 10 parallel thereto a thin rib 14 is provided which is secured to the frame 10 at both ends and has a rectangular cross-section, see FIGS. 2 and 3. At the center of each of the ribs 14 there is provided a locking stud 15 projecting at one side of the rib, said locking stud having a neck 16 and a hemispherical head 17, see FIG. 2. Between the ribs 11 and at the ends thereof there are flanges 18, in which circular holes 19 are formed, each lying at the same distance from the center of the fastening member as the locking studs 15. The circular holes 19 have a diameter which is smaller than the greatest diameter of the head 17 on the locking studs 15 and approximately corresponding to the diameter of the neck 16 of the locking studs.

Between each of the ribs 14 and the adjacent rib 11 and the adjacent side of the frame 10, respectively, slots 20 are provided, allowing the ribs 14 to bend outwards resiliently in the direction perpendicularly to the plane of the fastening member, and said slots also allow the ribs 11 to be bended resiliently outwards and away from each other in the plane of the fastening member.

It is possible to combine two fastening members of the type shown in FIG. 1. If it is desired to mount the fastening members on a fabric 21, FIG. 3, for example, a tarpaulin, a rain cape or a similar plate material, a hole for each of the locking studs is punched in advance in the fabric as well as a centre hole corresponding to the insertion opening of the fastening members. The two identical fastening members are now placed opposite each other on opposite sides of the fabric in such a way that the locking studs 15 on one of the fastening members lie opposite the corresponding holes 19 in the other fastening member, and by means of a suitable tool, e.g. tongs, the jaws having a similar form as the jaws of ticket tongs, the heads 17 on the locking studs are now under resilient deformation pressed in through the corresponding holes 19. The fastening members are hereby secured permanently to each other and to the fabric 21, as the rear edge of the heads 17 will serve as a barb preventing the heads from being drawn out of the holes 19.

The necks 16 of the locking studs 15 have such a length that the ribs 14, on which the locking studs are arranged, by locking the fastening members together about the fabric 21 will be somewhat deformed in a direction towards the fabric, see FIG. 3. The thicker the fabric 21 the more the thin ribs 14 will be deformed about the root of the locking studs 15, which will result in an increase of the effective length of the necks 16 of the locking studs. This circumstance will result therein that a snap fastener may be mounted on plate materials having different thicknesses. The same fastening members may e.g. be mounted on a tarpaulin, either at points where the tarpaulin consists of a single layer of fabric or at points where the tarpaulin is reinforced by one or several further layers. The ribs 14 will furthermore cause the two fastening members secured to one another to be maintained pressed against the fabric 21 by a suitable resilient force.

When the fastening members have been secured to each other by means of the locking studs 15 as described above, the two ribs 11 in each fastening member will be substantially perpendicular to the corresponding ribs in the other fastening member, so that the ribs 11 in the two fastening members together define a substantially square opening, as indicated in FIG. 1 by means of dot-and-dash lines.

The stud 13, FIG. 3, may be suitably secured to any object 22, for example the edge of a boat or another fabric, and the head of the stud has a diameter being somewhat greater than the distance between the ribs 11.

When it is desired to lock the snap fastener formed by the fastening members to the said stud, the head of the stud is pressed into the insertion opening 12. Then initially the head will be caught by and guided in the slit between the ribs 11 in the first fastening member. Then the ribs 11 will be resiliently bent outwards in such a way that the head may be led past said ribs, first in one and then in the other fastening member, whereafter the head of the stud will be releasably maintained by the ribs. In FIG. 3 the stud 13 has such a length that its head may be led in between and past the ribs 11 in both fastening members, and hereby a double locking and a good centering of the stud are obtained. However, it should be noted that a sufficiently good securing would be obtained if the head of the stud is led past the ribs 11 in only one of the fastening members, the ribs 11 in the second fastening member then centering the stud 13. This may be important when it is desired to use the fastening members according to the invention in connection with comparatively short studs already available.

Figure 4:
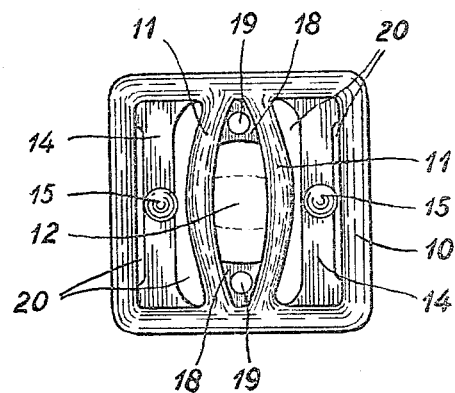
FIG. 4 is an elevation view of a second embodiment of the fastening member.

In FIG. 4 a modified embodiment of the fastening member is shown. This embodiment differs from the embodiment shown in FIG. 1 only by the ribs 11 having a slightly curved form. The ribs 11 in two fastening members secured to each other will together define an opening having slightly curved sides, and being indicated in FIG. 4 by dot-and-dash lines. Hereby an increased surface of contact between the ribs 11 and the head of the stud 13 is obtained when said head is led in between the ribs. The risk of permanent deformations of the ribs 11 as a result of great specific pressures will hereby be reduced.

Figure 5:
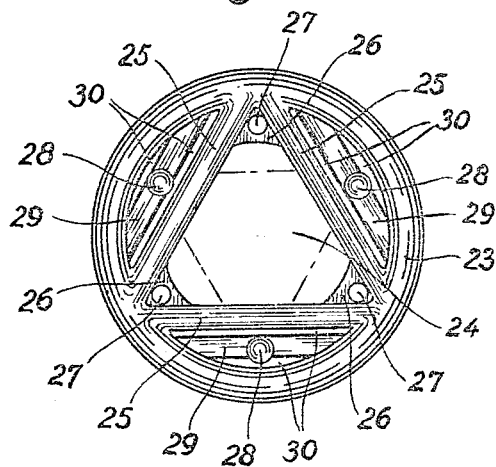
FIG. 5 is an elevation view of a third embodiment of the fastening member according to the invention.

Another embodiment of the fastening member according to the invention is shown in FIG. 5. The frame 23 of this fastening member has a circular form, and the insertion opening 24 for the stud 13 is defined by three ribs 25 together forming an equilateral triangle. Within the corners of said triangle there are provided flanges 26, in which there are circular holes 27 for locking studs 28. Locking studs 28 are arranged on thin ribs 29, each of which lies parallel to the ribs 25. On each side of the ribs 29 there are provided slots 30 having such a width that the ribs 25 may freely and resiliently be bent outwards and in the plane of the fastening member, while the ribs 30 may be bent outwards in the longitudinal direction of the locking studs, i.e., perpendicular to the plane of the fastening member. All the locking studs 28 and holes 27 are arranged on a circle which is concentric to the frame 23 and arranged on said circle at similarly spaced angular distances.

When two of the fastening members shown in FIG. 5 have been secured to one another in a way similar to the one described above, for example, by the locking studs 28 being pressed into the corresponding holes 27, the ribs 25 on the two fastening members will together define an insertion opening having the form of a regular hexagon, as indicated in FIG. 5 by dot-and-dash lines. Also in this case a comparatively great surface of contact will be obtained between the head of the stud and the ribs, when said stud is pressed in through the insertion opening. In general, the embodiment shown in FIG. 5 works in a similar way as the embodiments previously described.

It should be understood that it is not necessary to secure the two fastening members to each other by means of the shown locking studs. Instead of the fastening members may be secured to each other for example, by means of rivets or the like. Furthermore, it should be noted that the locking studs shown, in the case they are used, need not to be arranged on resilient ribs, if the snap fasteners should only be mounted on a plate material having one definite thickness. Finally it should be noted that it is possible to produce snap fasteners in which the two fastening members have different forms.

What I claim is

1. In a snap fastener, the combination comprising two plastic fastening members, each of said fastening members comprising a frame and resilient spaced ribs, each of said ribs being fixed at both ends to the frame of one of said fastening members, locking means for locking said fastening members in a superposed relationship, in which relationship said ribs of one of said members are angularly offset in relation to said ribs of the other of said members, the ribs of the two members jointly defining therebetween an opening delimited by the middle portions of said ribs, said opening being adapted for insertion therein of a studlike member having a transverse dimension larger than a transverse dimension of said opening, and said ribs being adapted to resiliently deflect to releasably engage said studlike member.

2. A snap fastener combination according to claim 1, wherein said locking means comprises locking studs, each of said locking studs being fastened to one of said fastening members at one end of said stud and extending to the other of said fastening members, there being an enlarged locking head formed at the free end of each of said locking studs, the fastening member parts opposite and adjacent to said locking heads in said superposed position of the fastening members defining holes a transverse dimension of each of which is slightly smaller than a transverse dimension of the corresponding locking head, whereby said locking head is tightly engaged with its corresponding hole.

3. A snap fastener combination according to claim 2, wherein said locking means further comprises thin ribs, each of said thin ribs being at both ends fastened to one of the fastening members so as to be flexible transversely to said one fastening member, said locking studs being fastened to said thin ribs between the ends thereof.

4. In a snap fastener, the combination comprising two similar plastic fastening members, each of said fastening members comprising a frame and resilient, substantially parallel spaced ribs, each of said ribs being fixed at both ends to the frame of said fastening members, locking means for permanently locking said fastening members in a superposed relationship, in which relationship said ribs on each fastening member extend transversely to the adjacent ribs in the other fastening member, the ribs of the two members jointly defining therebetween an opening delimited by the middle portions of said ribs, said opening being adapted for insertion therein of a studlike member having a transverse dimension larger than a transverse dimension of said opening, and said ribs being adapted to resiliently deflect to releasably engage said studlike member 5. A plastic fastening member for a snap fastener, said fastening member comprising a frame and resilient ribs fixed at both ends to said frame and extending in spaced relationship, locking means for locking said fastening member to a similar fastening member in superposed relationship, in which relationship the ribs of said fastening member are angularly offset in relation to the ribs of the similar fastening member, the ribs of said fastening member jointly defining with the ribs of the similar fastening member an opening delimited by the middle portions of said ribs, said opening being adapted for insertion therein of a studlike member having a transverse dimension larger than a transverse dimension of said opening, and said ribs being adapted to resiliently deflect to releasably engage said studlike member.

6. A snap fastener combination according to claim 2, wherein each of said locking studs is arranged upright at essentially right angles to the plane of the fastening member to which it is attached.

7. In a snap fastener, the combination comprising two plastic fastening members, each of said fastening members comprising a frame and resilient spaced ribs, each of said ribs being fixed at both ends to the frame of one of said fastening members, said ribs of each of said members defining a polygon, locking means for locking said fastening members in a superposed relationship, in which relationship the ribs of one of said members are angularly offset in relation to the ribs of the other of said members, the ribs of the two members jointly defining therebetween a polygonal opening delimited by the middle portions of said ribs and having twice the number of sides as compared with said first mentioned polygon, said opening being adapted for insertion therein of a studlike member having a transverse dimension larger than a transverse dimension of said opening, and said ribs being adapted to resiliently deflect to releasably engage said studlike member.

8. A snap fastener combination according to claim 7, in which said first mentioned polygon is a triangle.

9. A plastic fastening member for a snap fastener, said fastening member comprising a frame and resilient ribs fixed at both ends to said frame and extending in spaced relationship, locking means for locking said fastening member to a similar fastening member in superposed relationship, in which relationship the ribs of said fastening member are angularly offset in relation to the ribs of the similar fastening member, the ribs of said fastening member jointly defining with the ribs of the similar fastening member an opening delimited by the middle portions of said ribs, said opening being adapted for insertion therein of a studlike member having a transverse dimension larger than a transverse dimension of said opening, and said ribs being adapted to resiliently deflect to releasably engage said studlike member, said locking means comprising a locking stud having one end thereof fastened to said fastening member and having a free end extending outwardly from said fastening member and being adapted to tightly engage with a hole in the similar fastening member, whereby the fastening members are locked together 10. A plastic fastening member for a snap fastener, said fastening member comprising a frame and resilient ribs fixed at both ends to said frame and extending in spaced relationship, locking means for locking said fastening member to a similar fastening member in superposed relationship, in which relationship the ribs of said fastening member are angularly offset in relation to the ribs of the similar fastening member, the ribs of said fastening member jointly defining with the ribs of the similar fastening member an opening delimited by the middle portions of said ribs, said opening being adapted for insertion therein of a studlike member having a transverse dimension larger than a transverse dimension of said opening, and said ribs being adapted to resiliently deflect to releasably engage said studlike member, said locking means comprising a hole in said fastening member and a locking stud extending from said fastening member, said hole being adapted to tightly engage a locking stud extending from the similar fastening member and inserted in said hole, and said locking stud being adapted to tightly engage a hole in the similar fastening member, whereby the fastening members are locked together

References Cited by the Examiner

UNITED STATES PATENTS 2,010,506   8/1935   Carr _____ 24—216 X

FOREIGN PATENTS 616,118   7/1935   Germany.

WILLIAM FELDMAN, *Primary Examiner.*

E. SIMONSEN, *Assistant Examiner.*